(12) United States Patent
Shimura

(10) Patent No.: US 6,380,542 B1
(45) Date of Patent: Apr. 30, 2002

(54) RADIATION IMAGE DETECTING SYSTEM

(75) Inventor: Kazuo Shimura, Kanagawa-ken (JP)

(73) Assignee: Fuji Photo Film Co., Ltd, Kanagawa-Ken (JP)

( * ) Notice: Subject to any disclaimer, the term of this patent is extended or adjusted under 35 U.S.C. 154(b) by 0 days.

(21) Appl. No.: 09/383,919

(22) Filed: Aug. 26, 1999

(30) Foreign Application Priority Data

Aug. 26, 1998 (JP) .......................................... 10-240564
Aug. 2, 1999 (JP) .......................................... 11-218277

(51) Int. Cl.$^7$ .............................. G03B 42/02; G01T 1/24
(52) U.S. Cl. ............. 250/370.09; 250/367; 250/370.11; 250/385.1
(58) Field of Search ........................... 250/367, 370.09, 250/370.11, 385.1

(56) References Cited

U.S. PATENT DOCUMENTS

| | | | |
|---|---|---|---|
| 4,803,359 A | 2/1989 | Hosoi et al. | 250/327.2 |
| 4,851,678 A | 7/1989 | Adachi et al. | 250/327.2 |
| 4,905,149 A | 2/1990 | Adachi | 364/414.13 |
| 4,931,644 A | 6/1990 | Adachi et al. | 250/327.2 |
| 4,952,807 A | 8/1990 | Adachi | 250/327.2 |
| 4,967,079 A | 10/1990 | Shimura | 250/327.2 |
| 5,481,623 A | 1/1996 | Hara | 382/128 |
| 5,483,071 A * | 1/1996 | Oikawa | 250/370.09 |
| 5,668,889 A | 9/1997 | Hara | 382/132 |
| 5,825,032 A * | 10/1998 | Nonaka et al. | 250/370.09 |
| 5,880,470 A * | 3/1999 | Umetani et al. | 250/370.09 |

FOREIGN PATENT DOCUMENTS

| | | | |
|---|---|---|---|
| EP | 0898421 A2 | 2/1999 | ............ H04N/5/30 |
| JP | 1-216290 | 8/1989 | ............ G01T/1/24 |
| JP | 2-164067 | 6/1990 | ......... H01L/27/146 |

OTHER PUBLICATIONS

Medical Imaging V, Image Physics, 1991, vol. 1443, pp. 108–119, "Signal, Noise, and Readout Considerations in the Development of Amorphous Silicon Photodiode Arrays for Radiotherapy and Diagnostic X–ray Imaging", Antonuk, L. E. et al.

Lawrence Berkeley Laboratory, University of California, "Material Parameters in Thick Hydrogenated Amorphous Silicon Radiation Detectors", Qureshi, S. et al.

IEE Transactions on Nuclear Science, vol. 36, No. 2, Apr. 1989, "Metal/Amorphous Silicon Multilayer Radiation Detectors", Naruse, Yujiro et al.

\* cited by examiner

Primary Examiner—Constantine Hannaher
Assistant Examiner—Andrew Israel
(74) Attorney, Agent, or Firm—Sughrue Mion, PLLC

(57) ABSTRACT

A radiation image detecting system includes a solid radiation detector made up of a plurality of solid radiation detecting elements which are two-dimensionally arranged and convert radiations bearing thereon image information to an image signal. An A/D convertor converts the image signal as output from the solid radiation detector to a digital image signal. The digital image signal is analyzed and a characteristic of standardization processing which is to be carried out on the digital image signal is determined. A standardization processing circuit carries out standardization processing on the digital image signal according to the characteristic of standardization processing determined.

11 Claims, 6 Drawing Sheets

RADIATION IMAGE DETECTING SYSTEM

BACKGROUND OF THE INVENTION

1. Field of the Invention

This invention relates to a radiation image detecting system, and more particularly to an improvement of quality of a radiation image reproduced on the basis of image data output from a radiation image detecting system.

2. Description of the Related Art

There has been known a radiation image information read-out system using radiographic film or a stimulable phosphor sheet in medical radiography.

Recently there has been proposed a radiation image detecting system employing a solid radiation detector including a semiconductor as a major part which detects radiations and converts the intensity of radiations to an electric signal. Though various types of solid radiation detectors have been proposed, the following solid radiation detectors are representative.

That is, a solid radiation detector comprising a two-dimensional image reader formed by two-dimensionally forming a plurality of photoelectric conversion elements (each forming a picture element) on an insulating substrate and a phosphor layer (scintillator) which is formed on the two-dimensional image reader and generates visible light bearing thereon image information when exposed to radiations bearing thereon image information. The solid radiation detector of this type will be referred to as "a photo-conversion type solid radiation detector", hereinbelow.

A solid radiation detector comprising a two-dimensional image reader formed by two-dimensionally forming a plurality of charge collection electrodes (each forming a picture element) on an insulating substrate and a radiation-conductive material layer which is formed on the two-dimensional image reader and generates electric charges bearing thereon image information when exposed to radiations bearing thereon image information. The solid radiation detector of this type will be referred to as "a direct conversion type solid radiation detector", hereinbelow.

The photo-conversion type solid radiation detectors are disclosed, for instance, in Japanese Unexamined Patent Publication Nos. 59(1984)-211263 and 2(1990)-164057, PCT International Publication No. WO92/06501, "Signal, noise, and read out considerations in the development of amorphous silicon photodiode arrays for radiography and diagnostic x-ray imaging", L. E. Antonuk et. al., University of Michigan, R. A. street Xerox, PARC, SPIE vol. 1443, "Medical Imaging V", Image Physics (1991), pp. 108–119, and the like.

As the direct conversion type solid radiation detector, the following have been proposed.

1) A solid radiation detector which is about ten times as large as normal solid radiation detectors in thickness as measured in the direction in which radiations are transmitted through the solid radiation detector. See "MATERIAL PARAMETERS IN THICK HYDROGENATED AMORPHOUS SILICON RADIATION DETECTORS", Lawrence Berkeley Laboratory. University of California, Berkeley, Calif. 94720 Xerox Parc. Palo Alto. Calif. 94304.

2) Those comprising a plurality of solid radiation detectors laminated in the direction in which radiations are transmitted with metal plates intervening therebetween. See "Metal/Amorphous Silicon Multilayer Radiation Detectors", IEE TRANSACTIONS ON NUCLEAR SCIENCE. VOL. 36. NO.2 APRIL 1989.

3) Solid radiation detectors using CdTe and the like disclosed in Japanese Unexamined Patent Publication No. 1(1989)-216290.

This applicant has proposed an improvement on the direct conversion type solid radiation detector as disclosed in Japanese Patent Application 9(1997)-222114. The solid radiation detector will be referred to as "an improved direct conversion type solid radiation detector", hereinbelow.

The improved direct conversion type solid radiation detector comprises a first conductive layer which is transparent to recording radiations, a recording photoconductive layer which exhibits photoconductivity upon exposure to the recording radiations passing through the first conductive layer, a charge transfer layer which acts substantially as an insulator to electric charges of the same polarity as that in which the first conductive layer is charged and as a conductor to electric charges reverse to that in which the first conductive layer is charged, a read-out photoconductive layer which exhibits photoconductivity upon exposure to read-out electromagnetic waves, and a second conductive layer which is transparent the read-out electromagnetic waves. These layers are superposed one on another in this order and latent image charges are collected on the interface between the recording photoconductive layer and the charge transfer layer.

As a system for reading out the latent image charges in the improved direct conversion type solid radiation detector, there may be employed a read-out system where the read-out electrode (the second conductive layer) is made like a flat plate and the latent image charges are read out by scanning the read-out electrode with a read-out light spot such as a laser beam, or a read-out system where the read-out electrode is made like a stripe electrode (comb tooth electrode) and the latent image charges are read out by scanning the stripe electrode with a line light beam, extending in a direction perpendicular to the longitudinal direction of the stripe electrode, in the longitudinal direction of the stripe electrode.

In a radiation image detecting system using such a solid radiation detector, a radiation image which is poor in quality can be reproduced if the radiation image is reproduced on the basis of digital image data obtained by digitizing image data as it is output from the solid radiation detector. This is because the level of the image signal components output from the individual solid radiation detecting elements varies according to the radiographing conditions and/or the individual difference of the solid radiation detector, and accordingly if the radiation image is reproduced on the basis of digital image data obtained by digitizing image data as it is output from the solid radiation detector, the density and the contrast of the image cannot be always good. In this specification, the term "solid radiation detecting element" means an element which includes said photoelectric conversion element or the charge collection electrode as a major part and forms a picture element.

Further since the amount of a latent image charge which each solid radiation detecting element can store is limited, the radiation image detecting system using the solid radiation detector is lower in signal saturation level and narrower in dynamic range as compared with the conventional radiation image information read-out system using radiographic film or a stimulable phosphor sheet. Accordingly, even in the common working range, some picture elements can be saturated, the radiation image taken by the radiation image detecting system using the solid radiation detector is lower in quality than that taken by the conventional radiation image information read-out system using radiographic film or the like.

SUMMARY OF THE INVENTION

In view of the foregoing observations and description, the primary object of the present invention is to provide a radiation image detecting system using a solid radiation detector which can output image data which is improved in image quality.

In accordance with the present invention, there is provided a radiation image detecting system comprising a radiation detecting means comprising a plurality of solid radiation detecting elements which are two-dimensionally arranged and convert radiations bearing thereon image information to an image signal, an A/D convertor which converts the image signal as output from the radiation detecting means to a digital image signal, a standardization characteristic determining means which analyzes the digital image signal and determines a characteristic of standardization processing which is to be carried out on the digital image signal, and a standardization processing means which carries out standardization processing on the digital image signal according to the characteristic of standardization processing determined by the standardization characteristic determining means.

The standardization processing is signal processing for processing the digital image signal to conform to a proper input signal range of an image reproduction system or the like connected to the radiation image detecting system so that the density and/or the contrast of the reproduced image becomes proper. For example, by the standardization processing, the digital image signal is converted to an image signal suitable for the image reproduction system or the like in such a manner that maximum and minimum signal levels of the digital image signal in a desired image information range respectively conform to maximum and minimum values in a proper density range of an output visible image.

It is preferred that the radiation image detecting system be provided with a desired signal section determining means which determines a section of the digital image signal bearing thereon a desired section of the image information (this section of the digital image signal will be referred to as "the desired digital image section", hereinbelow) and that the standardization characteristic determining means analyzes the desired digital image signal section determined by the desired signal section determining means and determines the characteristic of standardization processing.

The desired digital image signal section may be determined in any manner. For example, image information in an irradiation field of the radiations may be taken as the desired section of the image information. In this case, as disclosed, for instance, in Japanese Unexamined Patent Publication Nos. 61(1986)-39039, 61(1986)-170178, and 63(1988)-259538, the irradiation field may be determined by various known irradiation field recognizing processing such as those in which dynamic edge extraction processing such as using Snakes algorithm is employed, those in which edge extraction processing such as using Hough transformation is employed or those in which prospective edge points which are considered to be on the edge of the irradiation filed are detected and the area surrounded by a line joining the prospective edge points is recognized to be the irradiation field. Further image information only on the object may be taken as the desired section of the image information as disclosed in Japanese Unexamined Patent Publication No. 4(1992)-11242. In this case, the peripheral edge of the image of the object is detected and the section of the image signal representing the area inside the detected peripheral edge may be taken as the desired digital image signal section. Further, as disclosed, for instance, in Japanese Unexamined Patent Publication No. 1(1989)-50171, image information only on a part of the object, e.g., cervical vertebrae and soft part, may be taken as the desired section of the image information. In this case, the section of the digital image signal representing the cervical vertebrae and the soft part is detected and the desired digital image signal section is determined on the basis of the detection.

It is preferred that the standardization characteristic determining means determines the characteristic of the standardization processing taking into account saturation properties of the solid radiation detecting elements, i.e., on the basis of information on saturation of the solid radiation detecting elements including the proportion of the number of the saturated solid radiation detecting elements to the total number of the solid radiation detecting elements, the position of the saturated solid radiation detecting elements in the image, or the like.

It is preferred that the standardization processing includes processing for reducing the bit numbers.

The radiation image detecting system of the present invention may be provided with a memory which stores standardized digital image signal.

It is preferred that the radiation image detecting system of the present invention be provided with an image display means which displays an image on the basis of the standardized digital image signal, and a standardization characteristic changing means for changing the characteristic of the standardization processing.

It is further preferred that the radiation image detecting system of the present invention be provided with an image signal output means which, when the characteristic of the standardization processing is not changed within a predetermined time after an image is displayed by the image display means, automatically outputs the digital image signal on the basis of which the image is displayed.

It is further preferred that the radiation image detecting system of the present invention be provided with an alarm means which gives the alarm when the characteristic of the standardization processing as determined by the standardization characteristic determining means is not one of a plurality of predetermined characteristics.

It is further preferred that the radiation image detecting system of the present invention be provided with a correction information output means which, when the characteristic of the standardization processing as determined by the standardization characteristic determining means is not one of a plurality of predetermined characteristics, outputs correction information for correcting the radiographing conditions to conditions which can present a digital image signal the characteristic of the standardization processing for which may be one of the predetermined characteristics.

It is otherwise preferred that the radiation image detecting system of the present invention be provided with a radiographing condition correcting means which, when the characteristic of the standardization processing as determined by the standardization characteristic determining means is not one of a plurality of predetermined characteristics, changes the radiographing conditions on the basis of one of the predetermined characteristics to conditions which can present a digital image signal the characteristic of the standardization processing for which may be said one of the predetermined characteristics.

In the radiation image detecting system of the present invention, since the digital image signal is subjected to standardization processing the characteristic of which is determined by analyzing the digital image signal, the digital image signal is made to conform to a proper input signal range of an image reproduction system or the like connected to the radiation image detecting system without affected by the radiographing conditions and/or the individual difference of the solid radiation detector used, and accordingly the density and/or the contrast of the reproduced image becomes proper.

When the standardization characteristic determining means analyzes the desired digital image signal section determined by the desired signal section determining means and determines the characteristic of standardization processing, the standardization characteristic determining means can determine more suitable characteristic of the standardization processing on the basis of only the digital image signal section representing effective section of the radiation image information.

Further when the standardization characteristic determining means determines the characteristic of the standardization processing taking into account saturation properties of the solid radiation detecting elements, the characteristic of the standardization processing can be determined without affected by saturation properties of the solid radiation detecting elements.

Further when processing for reducing the bit numbers is carried out on the digital image signal together with the standardization processing, the amount of data handled by the image reproducing system connected to the radiation image detecting system is reduced and the image reproducing system may be on a small scale, whereby the image reproducing system can be compact in size.

When the radiation image detecting system is provided with a memory which stores standardized digital image signal, the standardized digital image signal can be read out and an image can be reproduced on the basis of the image signal when necessary.

When the radiation image detecting system of the present invention is provided with an image display means which displays an image on the basis of the standardized digital image signal and a standardization characteristic changing means for changing the characteristic of the standardization processing, the characteristic of the standardization processing can be corrected while observing the reproduced image when the characteristic is not acceptable.

When the radiation image detecting system is further provided with an image signal output means which, when the characteristic of the standardization processing is not changed within a predetermined time after an image is displayed by the image display means, automatically outputs the digital image signal on the basis of which the image is displayed, the operator has only to correct the characteristic only when the characteristic is not acceptable.

When the radiation image detecting system is provided with an alarm means which gives the alarm when the characteristic of the standardization processing as determined by the standardization characteristic determining means is not one of a plurality of predetermined characteristics, an accident where a digital image signal standardized according to an unacceptable characteristic is output can be avoided.

Further when the radiation image detecting system is provided with a correction information output means which, when the characteristic of the standardization processing as determined by the standardization characteristic determining means is not one of a plurality of predetermined characteristics, outputs correction information for correcting the radiographing conditions to conditions which can present a digital image signal the characteristic of the standardization processing for which may be one of the predetermined characteristics, the operator can correct the radiographing conditions referring to the correction information and can retake a radiation image according to the corrected radiographing conditions.

Similarly when the radiation image detecting system is provided with a radiographing condition correcting means which, when the characteristic of the standardization processing as determined by the standardization characteristic determining means is not one of a plurality of predetermined characteristics, changes the radiographing conditions on the basis of one of the predetermined characteristics to conditions which can present a digital image signal the characteristic of the standardization processing for which may be said one of the predetermined characteristics, a radiation image can be retaken without any trouble to the operator.

DESCRIPTION OF THE PREFERRED EMBODIMENTS

Figure 1:
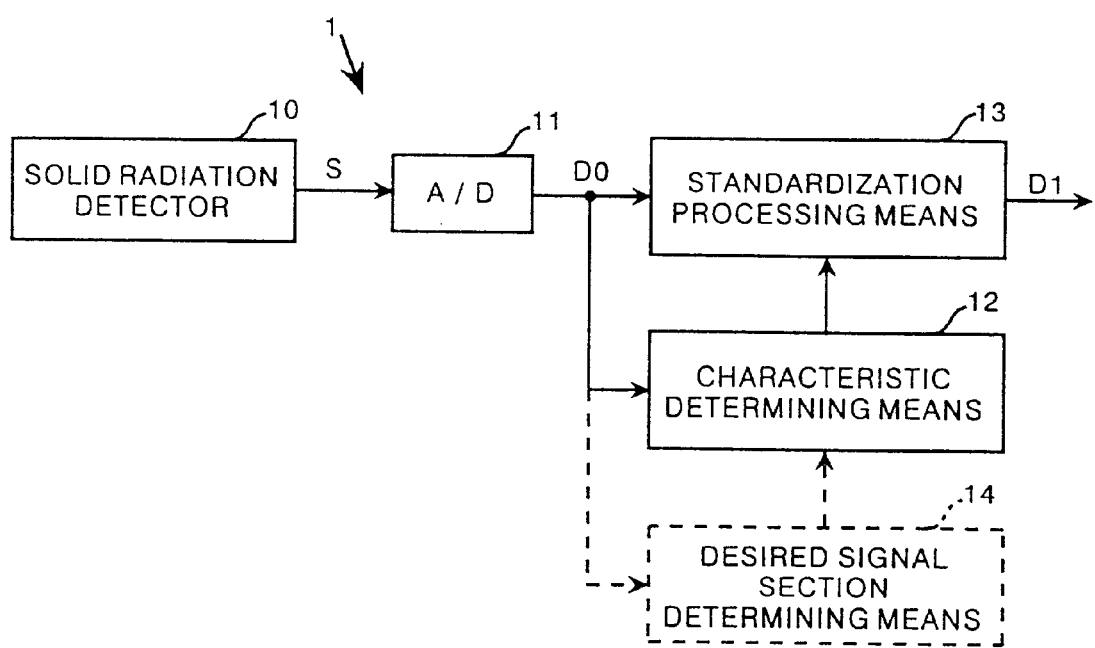
FIG. 1 is block diagram showing the arrangement of a radiation image detecting system in accordance with an embodiment of the present invention.

In FIG. 1, a radiation image detecting system 1 comprises a radiation detecting means (solid radiation detector) 10 comprising a plurality of solid radiation detecting elements (not shown) which are two-dimensionally arranged and convert radiations bearing thereon image information to an image signal S; an A/D convertor 11 which converts the image signal S as output from the radiation detecting means 10 to a digital image signal D0; a standardization characteristic determining means 12 which analyzes the digital image signal D0 and determines a characteristic of standardization processing which is to be carried out on the digital image signal D0; and a standardization processing means 13 which carries out standardization processing on the digital image signal D0 according to the characteristic of standardization processing determined by the standardization characteristic determining means 12. The radiation image detecting system 1 of this embodiment may be provided with a desired signal section determining means 14, as shown by the dashed line in FIG. 1, which determines a desired digital image section bearing thereon a desired section of the image information. The processed digital image signal D1 output from the standardization processing means 13 is input, for instance, into a radiation image reproducing system (not shown) and is reproduced as a visible image on a CRT or the like after subjected to predetermined image processing.

Operation of the radiation image detecting system 1 without the desired signal section determining means 14 will be described, hereinbelow.

An image signal S detected by the radiation detecting means 10 is input into the A/D convertor 11 and converted to a 16-bit digital image signal D0. The digital image signal D0 is input into the characteristic determining means 12 and the characteristic determining means 12 determines a characteristic of standardization processing, which is to be carried out on the digital image signal D0 by the standardization processing means 13, in the manner described later.

The radiation detecting means 10 may comprise any one of the aforesaid photo-conversion type solid radiation detectors, direct conversion type solid radiation detectors and improved direct conversion type solid radiation detectors.

Figure 2A:
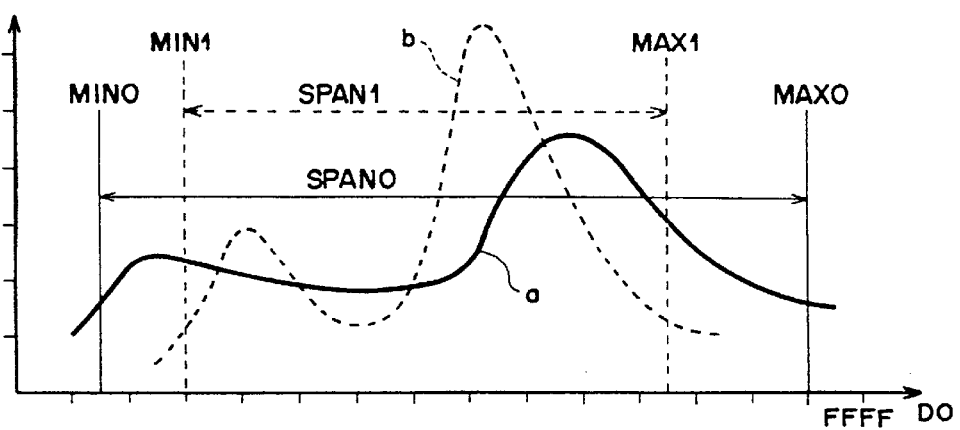
FIGS. 2A to 2C are views for illustrating a method of determining a characteristic of the standardization processing.

Operation of the characteristic determining means 12 and the standardization processing means 13 will be described with reference to FIGS. 2A to 2C, hereinbelow.

The characteristic determining means 12 first obtains a cumulative histogram of image signal components, each for a picture element, of the digital image signal D0. The solid line a and the dotted line b in FIG. 2A respectively show different examples of the cumulative histogram obtained by the characteristic determining means 12. In the cumulative histogram, frequencies of values of all the signal components making up an image signal for one radiation image are shown with the values of the signal components represented by the abscissa and the frequencies represents by the ordinate.

The solid line a shows a histogram for a digital image signal D0 representing a radiation image taken under certain conditions. Assuming that the minimum and maximum signal levels in a desired image information range of the digital image signal D0 are MIN0 and MAX0, the desired image information range SPAN0 is between MIN0 and MAX0.

The dotted line b shows a histogram for a digital image signal D0 representing a radiation image taken under different conditions, e.g., different in dose and/or object. MIN1 and MAX1 respectively denote the minimum and maximum signal levels in a desired image information range for the digital image signal D0 shown by the dotted line b.

The standardization processing characteristic determining means 12 causes the standardization processing means 13 to convert the 16-bit digital image signal D0, which gives a histogram shown by the line a or b, so that proper density and/or contrast (will be represented by proper density, hereinbelow) of the reproduced image can be obtained. Specifically, The 16-bit digital image signal D0 is converted to a 12-bit digital image signal D1, whose signal level range is from MIN2 to MAX2 which corresponds to a proper density range, so that the minimum signal level MIN0 (MIN1) and the maximum signal level MAX0 (MAX1) of the 16-bit digital image signal D0 respectively correspond to the minimum signal level MIN2 and the maximum signal level MAX2 of the 12-bit digital image signal D1. FIG. 2B shows a cumulative histogram of the 12-bit digital image signal D1 thus converted from the 16-bit digital image signal D0. Though, in this embodiment, the standardization processing includes bit reduction processing and the 16-bit digital image signal D0 is converted to the 12-bit digital image signal D1, the bit reduction processing may be omitted, that is, the 16-bit digital image signal D0 is converted to a 16-bit digital image signal D1, or may be carried out after the standardization processing.

Figure 2B:
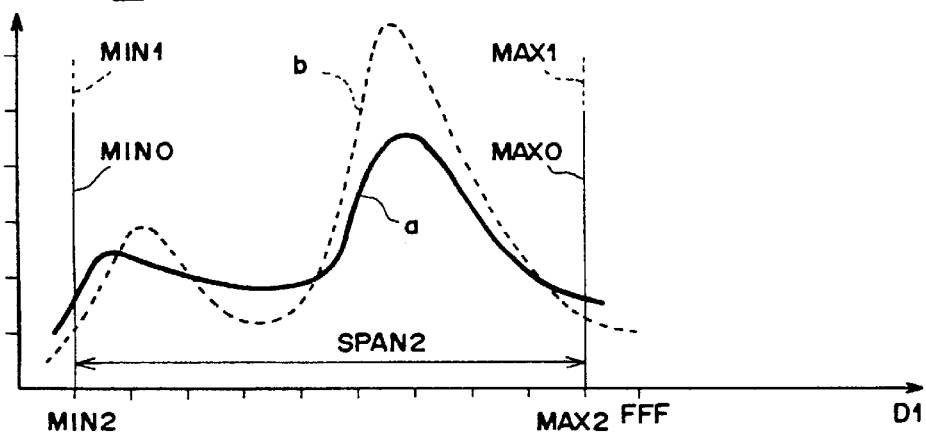

As can be understood from FIG. 2B, by carrying out the standardization processing according to the characteristic determined by the standardization processing characteristic determining means 12, the 16-bit digital image signal D0 can be converted to a 12-bit digital image signal D1, which is in the proper density range MIN2–MAX2, irrespective of the desired image information range of the 16-bit digital image signal D0.

Figure 2C:
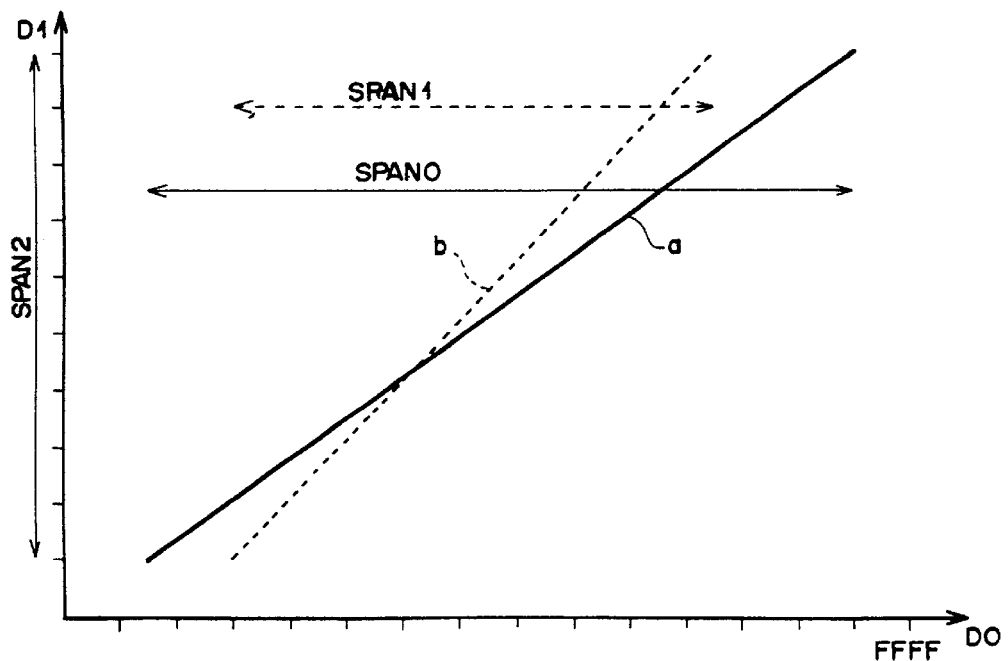

The 16-bit digital image signal D0 is converted to the 12-bit digital image signal D1 according to a predetermined conversion function such as shown by the solid line a or the dotted line b in FIG. 2C. In this embodiment, the conversion function shown by the solid line a is represented by the following formula, $$D1_a = D0_a \times Gain_a + Offset_a,$$

and the conversion function shown by the solid line b is represented by the following formula, $$D1_b = D0_b \times Gain_b + Offset_b.$$

That is, the standardization processing characteristic determining means 12 determines, as the characteristic of the standardization processing, a conversion function conforming to a cumulative histogram obtained, and causes the standardization processing means 13 to carry out image signal conversion according to the determined conversion function. With this operation, a 12-bit digital image signal D1, which is in the proper density range MIN2–MAX2, is output from the standardization processing means 13 irrespective of the desired image information range of the 16-bit digital image signal D0. Accordingly, by displaying a radiation image on the basis of the 12-bit digital image signal D1 output from the standardization processing means 13, a radiation image proper in density and/or contrast can be reproduced.

The conversion function need not be limited to a linear function but may be a high order function.

It is possible to prepare in advance a look-up table in which a plurality of expected histograms are related to conforming conversion functions and to determine as the characteristic of standardization processing a conversion function corresponding to the obtained cumulative histogram or a conversion function close to the conversion function corresponding to the obtained cumulative histogram referring to the look-up table.

Further, it is preferred that the standardization characteristic determining means 12 determines the characteristic of the standardization processing taking into account saturation properties of the solid radiation detecting elements, e.g., the fact that the solid radiation detecting elements are low in saturation level, that is, on the basis of information on saturation of the solid radiation detecting elements including the proportion of the number of the saturated solid radiation detecting elements to the total number of the solid radiation detecting elements, the position of the saturated solid radiation detecting elements in the image, or the like. The proportion of the number of the saturated solid radiation detecting elements to the total number of the solid radiation detecting elements may be obtained by counting the number of the solid radiation detecting elements whose out signal levels are close to FFFF on the aforesaid cumulative histogram.

Figure 3:
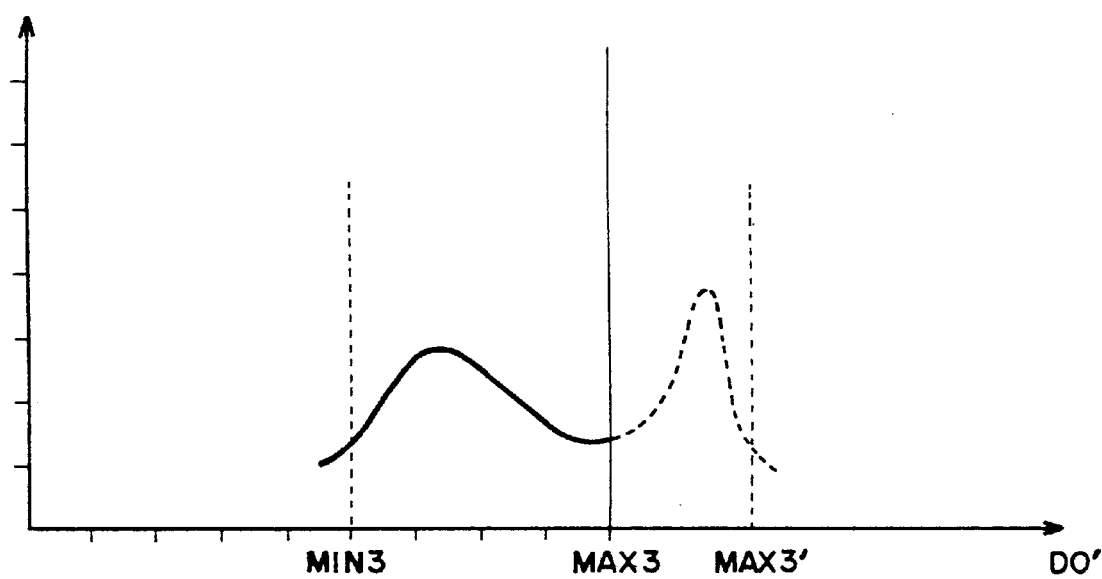
FIG. 3 is a view showing an example of a cumulative histogram where there are saturated picture elements.

Whether the output signal of a solid radiation detecting element is saturated can be detected, for instance, in the following manner. The digital image signal D0 is first compressed. Then a cumulative histogram for the compressed digital image signal is obtained. When the ratio of frequencies at minimum and maximum values in a quantization range of the compressed digital image data to the total number of the picture elements in the compressed digital image signal is not smaller than a predetermined threshold value, it is determined that a part of the image is saturated. For example, when the output signals of the solid radiation detecting elements are saturated, the digital image signal is saturated on the high level side. Accordingly, the cumulative histogram for the compressed digital image signal has a peak near the maximum value MAX3 of the image signal as shown in FIG. 3. When the value of this peak is not smaller than a predetermined threshold value, it is determined that a part of the image is saturated.

When it is determined that a part of the image is saturated, the characteristic of the standardization processing is determined so that not the image information range MIN3–MAX3 but the image information range MIN3–MAX3' (MAX3'=MAX3+a predetermined width CW) corresponds to the proper density range MIN2–MAX2.

Further it is possible to once determine the characteristic of the standardization processing in the regular manner described above and then change the characteristic according to the proportion of the saturated picture elements so that proper density or contrast can be obtained. Specifically, when the picture elements are saturated on the high density side, the characteristic determined in the regular manner is adjusted so that the density and the contrast are lowered. The degree of the adjustment may be set according to the degree of saturation.

When the radiation image detecting system 1 is provided with a desired signal section determining means 14, which determines a desired digital image section bearing thereon a desired section of the image information, as shown by the dotted line in FIG. 1 and the standardization characteristic determining means 12 determines the characteristic of standardization processing on the basis of only the desired digital image section (e.g., a section representing only an irradiation field) determined by the desired signal section determining means 14, the standardization characteristic determining means 12 can determine more suitable characteristic of the standardization processing on the basis of only the digital image signal section representing effective section of the radiation image information.

The desired signal section determining means 14 may recognize an irradiation field of the radiations by various known irradiation field recognizing processing such as those disclosed in Japanese Unexamined Patent Publication Nos. 61(1986)-39039, 61(1986)-170178, and 63(1988)-59538 and may take the irradiation field as the desired section of the image information. Further the desired signal section determining means 14 may be provided with a means for detecting the peripheral edge of the image of the object such as disclosed in Japanese Unexamined Patent Publication No. 4(1992)-11242 and may take the section of the image signal representing the area inside the detected peripheral edge as the desired digital image signal section. Further, the desired signal section determining means 14 may be provided with a means for detecting a particular part of the object, e.g., cervical vertebrae and soft part, as disclosed, for instance, in Japanese Unexamined Patent Publication No. 1(1989)-50171, and may determine the desired digital image signal section on the basis of the detection.

Figure 4:
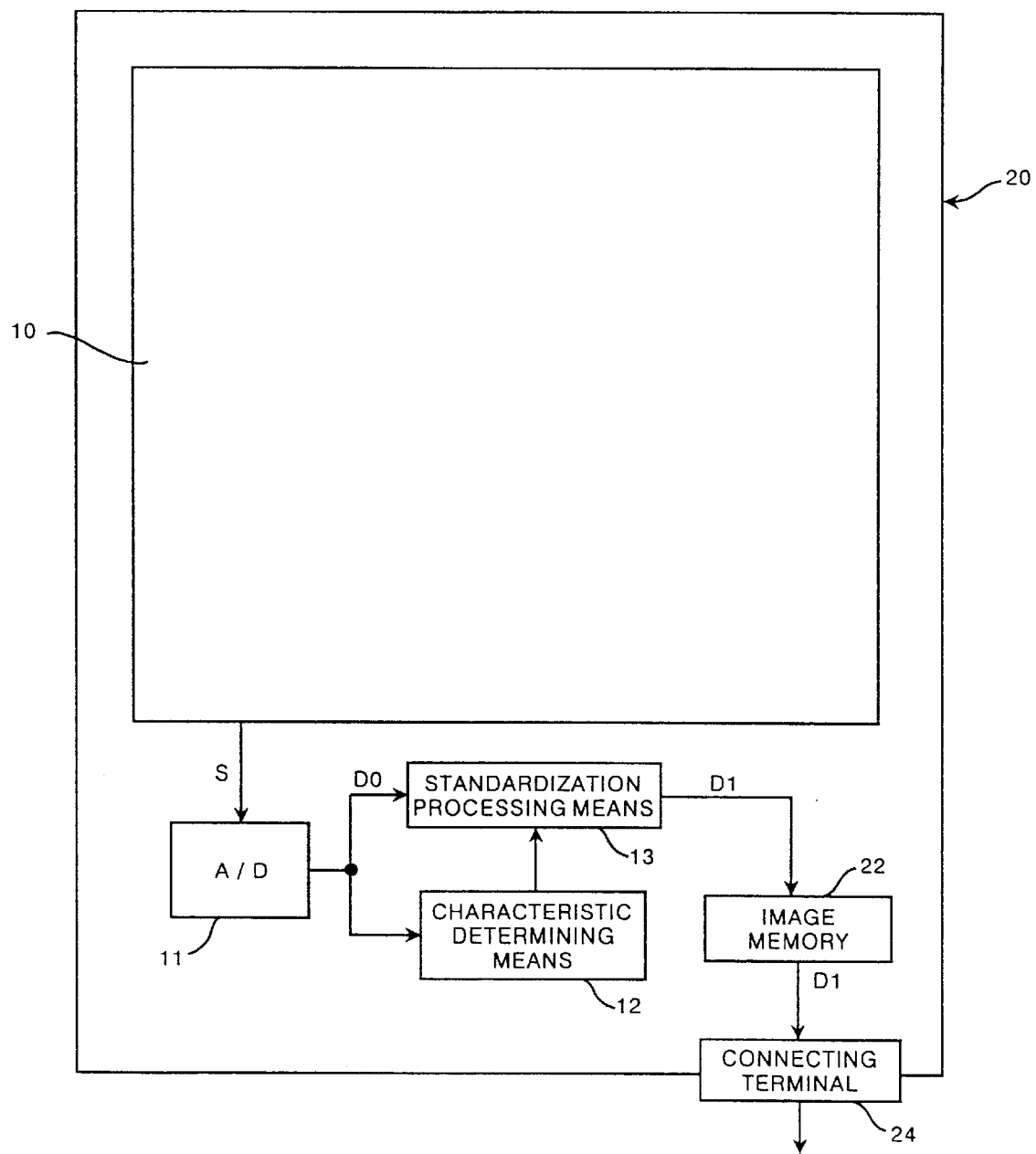
FIG. 4 is a schematic view showing a radiation image detecting cassette in accordance with another embodiment of the present invention.
Figure 5:
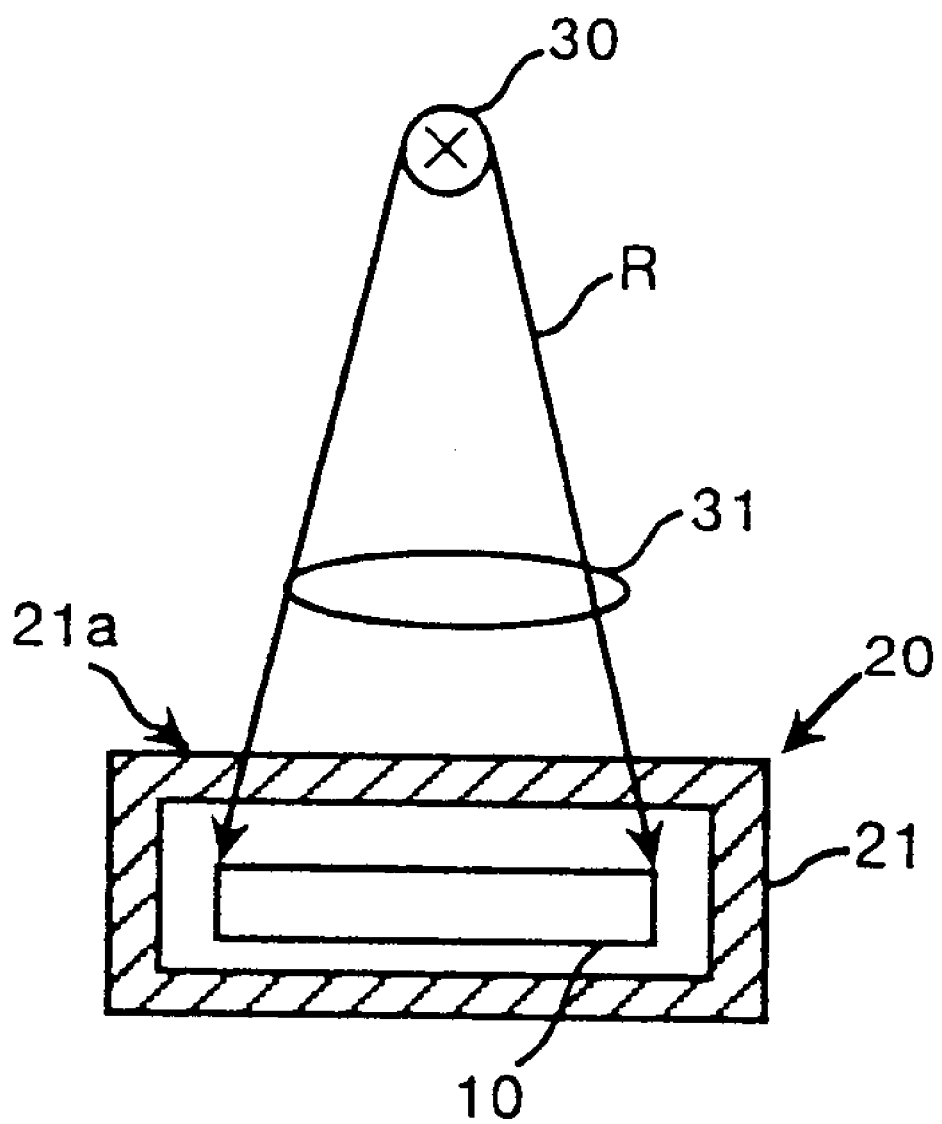
FIG. 5 is a schematic view for illustrating how to use the radiation image detecting cassette shown in FIG. 4.

A radiation image detecting system in accordance with another embodiment of the present invention will be described with reference to FIGS. 4 and 5, hereinbelow. In this embodiment, the radiation image detecting system is in the form of a radiation image detecting cassette 20. In FIGS. 4 and 5, the elements analogous to those shown in FIG. 1 are given the same reference numerals and will not be described in detail here.

As shown in FIGS. 4 and 5, the radiation image detecting cassette 20 comprises a radiation detecting means (solid radiation detector) 10, an A/D convertor 11, a standardization characteristic determining means 12, a standardization processing means 13, and an image memory 22 which stores the processed digital image signal D1 output from the standardization processing means 13. These elements are housed in a casing 21 and a connecting terminal 24 for outputting the digital image signal D1 to an external radiation image reproducing system (not shown) is provided on the casing 21. The image memory 22 may have a storage capacity of one or more frames of image. The image memory 22 is energized by a source (not shown) exclusively for the memory 22.

The radiation image detecting cassette 20 is connected to the external radiation image reproducing system by way of the connecting terminal 24 and the elements other than the image memory 22 are energized by a source on the external radiation image reproducing system. When taking a radiation image, the radiation image detecting cassette 20 is positioned with respect to a radiation source 30 so that radiations R radiated from the radiation source 30 and passing through an object 31 impinge upon the radiation detecting means 10 as shown in FIG. 5.

The radiations R bearing thereon radiation image information on the object 31 passes through a top plate 21a and impinge upon the solid radiation detector (radiation detecting means) 10. The radiations R bearing thereon the radiation image information are converted to electric signals by the solid radiation detecting elements of the solid radiation detector 10 and output as an image signal S bearing thereon the radiation image information. The image signal S is processed by the standardization processing means 13 in the manner described above and the processed digital image signal D1 is output from the standardization processing means 13. The processed digital image signal D1 is stored in the image memory 22. The processed digital image signal D1 may be stored in the image memory 22 when the operator inputs instruction through a switch or the like or may be automatically stored, for instance, upon termination of the standardization processing.

After taking the radiation image, the radiation image detecting cassette 20 may be set to an external radiation image reproducing system as required. When the radiation image detecting cassette 20 is set to an external radiation image reproducing system, the radiation image reproducing system reads out the digital image signal D1 from the image memory 22, carries out predetermined image processing and reproduces the radiation image of the object 31 as a visible image.

Thus with the radiation image detecting cassette 20 of this embodiment, the radiation image can be reproduced as required. Further since the radiation image detecting cassette 20 is connected to an external radiation image reproducing system by way of the connecting terminal 24, the radiation image detecting cassette 20 need not be constantly connected to an external radiation image reproducing system by way of a cable, whereby the cassette can be freely moved to anywhere and the freedom of positioning the cassette 20 upon taking a radiation image can be increased.

Instead of providing a connecting terminal 24, the processed digital image signal D1 may be transmitted to external radiation image reproducing system by radio communication.

Further when the image memory 22 has storage capacity sufficient to store a plurality of frames of radiation images, the digital image signal D1 need not be output each time an image is detected but a plurality of digital image signals D1 for a plurality of images may be output in one time after a plurality of images are taken, which shortens the overall time required to take an image and reproduce the image.

Further when the cassette 20 is substantially of the same size as a conventional X-ray film cassette, the radiation image detecting cassette 20 of this embodiment can be set to a conventional radiographing system as it is.

Figure 6:
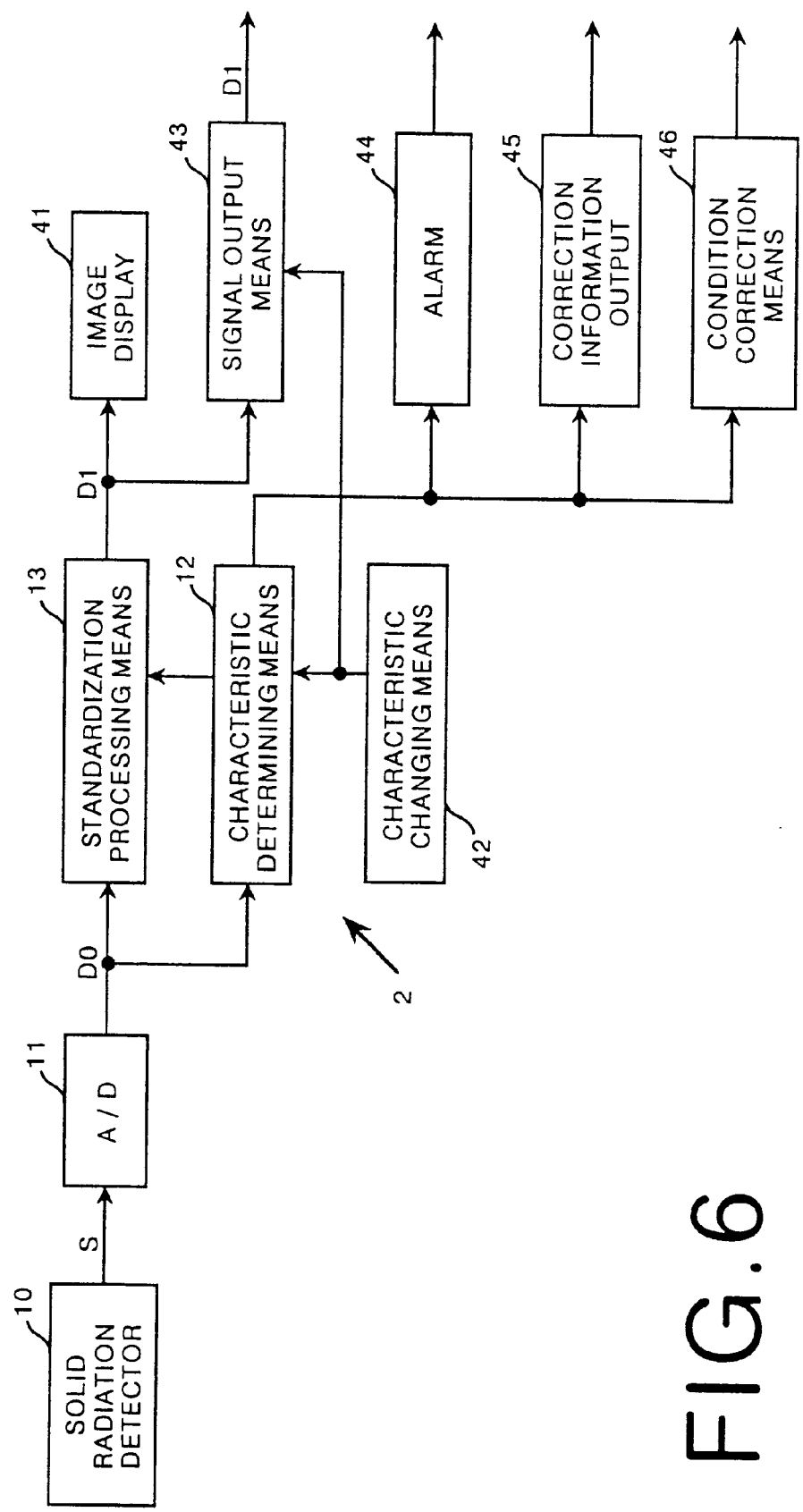
FIG. 6 is block diagram showing the arrangement of a radiation image detecting system in accordance with still another embodiment of the present invention.

A radiation image detecting system 2 in accordance with still another embodiment of the present invention will be described with reference to FIG. 6, hereinbelow. As shown in FIG. 6, the radiation image detecting system 2 of this embodiment differs from the radiation image detecting system 1 shown in FIG. 1 in that it is further provided with an image display means 41 which displays an image on the basis of a processed digital image signal D1, a standardization characteristic changing means 42 for changing the characteristic of the standardization processing, an image signal output means 43 which, when the characteristic of the standardization processing is not changed within a predetermined time after an image is displayed by the image display means 41, automatically outputs the digital image signal D1 on the basis of which the image is displayed, an alarm means 44 which gives the alarm when the characteristic of the standardization processing as determined by the standardization characteristic determining means 12 is not one of a plurality of predetermined characteristics, a correction information output means 45 which, when the characteristic of the standardization processing as determined by the standardization characteristic determining means 12 is not one of the predetermined characteristics, outputs correction information for correcting the radiographing conditions to conditions which can present a digital image signal the characteristic of the standardization processing for which may be one of the predetermined characteristics, and a radiographing condition correcting means 46 which, when the characteristic of the standardization processing as determined by the standardization characteristic determining means 12 is not one of the predetermined characteristics, changes the radiographing conditions on the basis of one of the predetermined characteristics to conditions which can present a digital image signal the characteristic of the standardization processing for which may be said one of the predetermined characteristics. It is preferred that the image display means 41 comprises a flat panel display such as a liquid crystal panel, an organic EL panel or the like. The radiation image detecting system 2 of this embodiment may be in the form of a radiation image detecting cassette similar to that of the preceding embodiment. Further the radiation image detecting system 2 of this embodiment my be further provided with a desired signal section determining means 14.

Operation of the radiation image detecting system 2 of this embodiment will be described, hereinbelow.

A digital image signal D0 is standardized in the manner described above and an image is displayed by the image display means 41 on the basis of the standardized digital image signal D1. When the image displayed by the image display means 41 is not acceptable in quality, the operator operates the characteristic changing means 42 to cause the standardization processing characteristic determining means 12 to select another characteristic of the standardization processing. On the other hand, the image signal output means 43 automatically outputs the digital image signal D1 on the basis of which the image is displayed to a radiation image reproducing system, a filing system, a printer or the like connected to the radiation image detecting system 2 when the characteristic of the standardization processing is not changed within a predetermined time after an image is displayed by the image display means 41. With this arrangement, the operator can correct the characteristic of the standardization processing while observing the reproduced image when the characteristic is not acceptable, and need not take any action when the reproduced image is acceptable.

When the characteristic of the standardization processing as determined by the standardization characteristic determining means 12 is not one of a plurality of predetermined characteristics, the alarm means 44 gives the alarm and the correction information output means 45 outputs correction information for correcting the radiographing conditions to conditions which can present a digital image signal the characteristic of the standardization processing for which may be one of the predetermined characteristics, and the operator changes the radiographing conditions according to the correction information, whereby the operator can retake a radiation image according to the corrected radiographing conditions so that proper standardization processing characteristic can be obtained.

Instead of the operator changing the radiographing conditions, the radiographing condition correcting means 46 may change the radiographing conditions on the basis of one of the predetermined characteristics so that a radiation image can be retaken without any trouble to the operator and proper standardization processing characteristic can be obtained.

What is claimed is:

1. A radiation image detecting system comprising:

a radiation detecting means comprising a plurality of solid radiation detecting elements which are two-dimensionally arranged and convert radiation bearing thereon image information to an image signal, an A/D converter which converts the image signal as output from the radiation detecting means to a digital image signal, a standardization characteristic determining means which analyzes the digital image signal and determines a characteristic of standardization processing which is to be carried out on the digital image signal, a standardization processing means which carries out standardization processing on the digital image signal according to the characteristic of standardization processing determined by the standardization characteristic determining means, and a desired signal section determining means which determines a desired digital image section of the digital image signal bearing thereon a desired section of the image information and in which the standardization characteristic determining means analyzes the desired digital image signal section determined by the desired signal section determining means and determines the characteristic of the standardization processing.

2. A radiation image detecting system comprising:

a radiation detecting means comprising a plurality of solid radiation detecting elements which are two-dimensionally arranged and convert radiation bearing thereon image information to an image signal, an A/D converter which converts the image signal as output from the radiation detecting means to a digital image signal, and a standardization characteristic determining means which analyzes the digital image signal and determines a characteristic of standardization processing which is to be carried out on the digital image signal, a standardization processing means which carries out standardization processing on the digital image signal according to the characteristic of standardization processing determined by the standardization characteristic determining means, in which the standardization characteristic determining means determines the characteristic of the standardization processing taking into account saturation properties of the solid radiation detecting elements.

3. A radiation image detecting system comprising:

a radiation detecting means comprising a plurality of solid radiation detecting elements which are two-dimensionally arranged and convert radiation bearing thereon image information to an image signal, an A/D converter which converts the image signal as output from the radiation detecting means to a digital image signal, a standardization characteristic determining means which analyzes the digital image signal and determines a characteristic of standardization processing which is to be carried out on the digital image signal, and a standardization processing means which carries out standardization processing on the digital image signal according to the characteristic of standardization processing determined by the standardization characteristic determining means, in which the standardization processing includes processing for reducing a number of bits for representing levels of the digital image signal.

4. The system of claim 3, wherein the standardization and reduction of bit numbers occurs concurrently.

5. A radiation image detecting system comprising:

a radiation detecting means comprising a plurality of solid radiation detecting elements which are two-dimensionally arranged and convert radiation bearing thereon image information to an image signal, an A/D converter which converts the image signal as output from the radiation detecting means to a digital image signal, a standardization characteristic determining means which analyzes the digital image signal and determines a characteristic of standardization processing which is to be carried out on the digital image signal, a standardization processing means which carries out standardization processing on the digital image signal according to the characteristic of standardization processing determined by the standardization characteristic determining means, an image display means which displays an image on the basis of the standardized digital image signal, and a standardization characteristic changing means for changing the characteristic of the standardization processing.

6. A radiation image detecting system as defined in claim 5 further comprising an image signal output means which, when the characteristic of the standardization processing is not changed within a predetermined time after an image is displayed by the image display means, automatically outputs the digital image signal on the basis of which the image is displayed.

7. A radiation image detecting system comprising:

a radiation detecting means comprising a plurality of solid radiation detecting elements which are two-dimensionally arranged and convert radiation bearing thereon image information to an image signal, an A/D converter which converts the image signal as output from the radiation detecting means to a digital image signal, a standardization characteristic determining means which analyzes the digital image signal and determines a characteristic of standardization processing which is to be carried out on the digital image signal, a standardization processing means which carries out standardization processing on the digital image signal according to the characteristic of standardization processing determined by the standardization characteristic determining means, and an alarm means which gives the alarm when the characteristic of the standardization processing as determined by the standardization characteristic determining means is not one of a plurality of predetermined characteristics.

8. A radiation image detecting system comprising:

a radiation detecting means comprising a plurality of solid radiation detecting elements which are two-dimensionally arranged and convert radiation bearing thereon image information to an image signal, an A/D converter which converts the image signal as output from the radiation detecting means to a digital image signal, a standardization characteristic determining means which analyzes the digital image signal and determines a characteristic of standardization processing which is to be carried out on the digital image signal, a standardization processing means which carries out standardization processing on the digital image signal according to the characteristic of standardization processing determined by the standardization characteristic determining means, and a correction information output means which, when the characteristic of the standardization processing as determined by the standardization characteristic determining means is not one of a plurality of predetermined characteristics, outputs correction information for correcting radiographing conditions to conditions which can present a digital image signal the characteristic of the standardization processing for which may be one of the predetermined characteristics.

9. The system of claim 8, wherein the correction information output means outputs correction information based on a distribution of occurrences of signal levels of the digital image signal.

10. A radiation image detecting system comprising:

a radiation detecting means comprising a plurality of solid radiation detecting elements which are two-dimensionally arranged and convert radiation bearing thereon image information to an image signal, an A/D converter which converts the image signal as output from the radiation detecting means to a digital image signal, a standardization characteristic determining means which analyzes the digital image signal and determines a characteristic of standardization processing which is to be carried out on the digital image signal, a standardization processing means which carries out standardization processing on the digital image signal according to the characteristic of standardization processing determined by the standardization characteristic determining means, and a radiographing condition correction means which, when the characteristic of the standardization processing as determined by the standardization processing as determined by the standardization characteristic determining means is not one of a plurality of predetermined characteristics, changes radiographing conditions on the basis of one of the predetermined characteristics to conditions which can present a digital image signal the characteristics of the standardization processing for which may be said one of the predetermined characteristics.

11. The system of claim 10, wherein the radiographing condition correction means changes the radiographing conditions based on a distribution of occurrences of signal levels of the digital image signal.

\* \* \* \* \*